(12) United States Patent
Suitor et al.

(10) Patent No.: US 11,771,011 B2
(45) Date of Patent: Oct. 3, 2023

(54) GRAIN STORAGE ARRANGEMENT (71) Applicant: Grain Storage Pty Ltd, Bulla (AU)

(72) Inventors: Odette Nydia Maria Suitor, Sunbury (AU); Grant Burns, Sunbury (AU)

(73) Assignee: GRAIN STORAGE PTY LTD., Victoria (AU)

( * ) Notice: Subject to any disclaimer, the term of this patent is extended or adjusted under 35 U.S.C. 154(b) by 27 days.

(21) Appl. No.: 17/440,417

(22) PCT Filed: Mar. 19, 2020

(86) PCT No.: PCT/AU2020/050262
§ 371 (c)(1),
(2) Date: Sep. 17, 2021

(87) PCT Pub. No.: WO2020/186306
PCT Pub. Date: Sep. 24, 2020

(65) Prior Publication Data
US 2022/0159907 A1 May 26, 2022

(30) Foreign Application Priority Data
Mar. 19, 2019 (AU) .............................. 2019900904

(51) Int. Cl.
*A01F 25/20* (2006.01)
*A01D 90/10* (2006.01)
(Continued)

(52) U.S. Cl.
CPC .............. *A01F 25/20* (2013.01); *A01D 90/10* (2013.01); *A01F 25/183* (2013.01); *B65G 3/04* (2013.01)

(58) Field of Classification Search
CPC ........ A01F 25/20; A01F 25/183; A01D 90/10
See application file for complete search history.

(56) References Cited

U.S. PATENT DOCUMENTS

| | | | | | |
|---|---|---|---|---|---|
| 867,962 | A | * | 10/1907 | Finton | B65G 1/06 |
| | | | | | 193/2 R |
| 4,362,453 | A | * | 12/1982 | Driedger | E04H 7/28 |
| | | | | | 414/268 |

(Continued)

FOREIGN PATENT DOCUMENTS

| CA | 1126467 | | 6/1982 | |
|---|---|---|---|---|
| CA | 1126467 A | * | 6/1982 | ............... E04H 7/30 |

OTHER PUBLICATIONS

International Search Report; Corresponding PCT Application No. PCT/AU2020/050262; Matthew Eaton, Australian Patent Office; dated May 4, 2020.

*Primary Examiner* — Kaitlin S Joerger
(74) *Attorney, Agent, or Firm* — Squire Patton Boggs (US) LLP (57) ABSTRACT

A grain storage arrangement, the arrangement including: a generally box-shaped grain storage receptacle enclosing a grain receiving space; the storage receptacle including a base, a top, two opposite sidewalls, a first end wall, and a second end wall opposite the first end wall; a receptacle support, wherein the receptacle support supports the receptacle such that the base slopes downwardly from the first end wall to the second end wall; a grain inlet provided on or proximate to the first end wall for adding grain to the receptacle; and a grain outlet provided on or proximate to the second end wall for removing grain from the receptacle.

20 Claims, 3 Drawing Sheets

(51) Int. Cl.
*A01F 25/18* (2006.01)
*B65G 3/04* (2006.01)

(56) References Cited

U.S. PATENT DOCUMENTS

| | | | | |
|---|---|---|---|---|
| 4,983,089 A | * | 1/1991 | Rose | B65D 88/121 |
| | | | | 414/919 |
| 2012/0099954 A1 | | 4/2012 | Teichrob et al. | |

* cited by examiner

GRAIN STORAGE ARRANGEMENT

The present application claims priority from Australian Provisional Patent Application 2019900904 filed 19 Mar. 2019, the entire contents of which is incorporated herein by reference.

TECHNICAL FIELD

The present invention relates generally to bulk storage. More particularly, the invention relates to the bulk storage of grain, and will be herein described in this context. However, it is to be appreciated that the invention has broader application than this specific application, and may be used for bulk storing materials other than grain for both agricultural and non-agricultural applications.

BACKGROUND TO THE INVENTION

The temporary storage of grain on-farm may be necessary during unusually large harvests when off-farm storage capacities are (or are likely to be) exceeded. On-farm grain storage is, of course, only possible if the farm has in place a grain storage facility. Several on-farm storage solutions are currently available.

The most basic of on-farm temporary grain storage solutions is that of a ground dump without a cover. In other words, the grain is simply stored on an available plot of land, without any cover provided. As can be appreciated, the set-up costs of such an arrangement are minimal. All that is required is a plot of land, which is preferably higher than the surrounding land, slightly sloping, well drained and above the water table. However, it can be readily appreciated that the risk of damage by water, insects, animals and moulds is greater than for other storage types. Therefore, grain should be moved from the dump as quickly as possible to minimise damage.

Another temporary storage option is that of pad storage, which is a ground dump arrangement including a cover. Pad storages are ground dumps covered with protective sheeting and, usually, formed on a ground sheet. Site requirements are similar to those for a ground dump. While such arrangements are more weatherproof than ground dumps and relatively low-cost storage solutions, they are still far from ideal ways of storing grain, and are prone to mould and insect infestation.

A more weather proof on-farm storage is the use of mesh silos. These can store small quantities of grain of up to 100 tonnes. Silos are, however, relatively costly to construct, with a single 100 tonne silo currently costing around AU$20,000. Such costs can be prohibitively expensive for many farmers, particularly if multiple silos are required.

Grain can, of course, be stored temporarily in grain bags, although this is relatively expensive and inefficient in terms of the labour necessary.

Yet another grain storage solution is that of underground pits. Underground pits are an effective, low-cost method of long-term grain storage. Their most common use is for storing drought feed reserves on farms. Feed grain has been recovered from pits in good condition after more than 10 years. The main drawback of underground storage, however, is the difficulty of removing grain.

The use of an underground pit is successful only if careful precautions are taken. Grain moisture content must be less than 12% to keep the risk of spoilage low. The pit must be located on a well-drained site above the water table, with the immediate surrounds graded to prevent rainfall run-off collecting in the pit area. Water seepage through the side walls of the pit is also a major concern.

The pits should not be more than three metres wide. This allows the covering soil to be placed and removed by a front-end loader without having to drive over the top of the grain. The depth will be determined by the unloading facilities. Pit capacity is generally aligned to available silo and truck capacity so that the pit can be completely emptied once it is opened.

A layer of soil typically about 0.5 metres thick provides good protection. To unload the pit, it is necessary to be able to remove all the covering soil without contaminating the grain. This can be difficult and is the reason for using narrow pits. Thus, it can be appreciated that the use of pits can be far from an ideal storage solution.

Thus, it would be desirable to provide a temporary grain storage solution which is relatively weather proof, provides ease of storage and removal of the grain, and relatively low-cost to construct when compared to existing on-farm grain storage arrangements.

SUMMARY OF THE INVENTION

According to a broad aspect of the present invention, there is provided a grain storage arrangement. The arrangement includes a generally box-shaped grain storage receptacle enclosing a grain receiving space. The storage receptacle includes a base, a top, two opposite sidewalls, a first end wall, and a second end wall opposite the first end wall. A receptacle support is also provided. The receptacle support supports the receptacle such that the base slopes downwardly from the first end wall to the second end wall. A grain inlet is provided on or proximate to (that is, at least proximate to) the first end wall for adding grain to the receptacle. A grain outlet is provided on or proximate to (that is at least proximate to) the second end wall for removing grain from the receptacle.

The inlet preferably includes an inlet cover. The inlet cover is preferably movable from an inlet open position to an inlet closed position.

In a preferred form, the outlet includes an outlet cover, with the outlet cover movable from an outlet open position to an outlet closed position.

It is envisaged that the arrangement may include at least two receptacles. It is envisaged that in such an arrangement the receptacle support supports each of the receptacles, such that the base of each receptacle slopes downwardly from the first end wall of the receptacle to the second end wall of the receptacle.

The arrangement may include any practical number of receptacles. In a particularly preferred form, five receptacles are provided.

The base of each receptacle may slope downwardly from the first end wall to the second end wall at any suitable angle. It is envisaged that a suitable base slope may be between approximately 20° and approximately 30° from horizontal. A particularly suitable base slope may be approximately 28° degrees from horizontal. It will be appreciated that the receptacles are orientated to provide sloping bases, such that any grain stored within the receptacles can be relatively readily removed though the grain outlet of each receptacle.

The arrangement may include an auger, conveyer, or other suitable grain feeding device, for feeding grain from an associated grain hopper and through the grain inlet of each receptacle to store grain in the receptacles.

The auger and hopper are both preferably mounted on wheels. This allows the auger and hopper to be moved to feed grain from the hopper, via the auger and through the grain inlet of a selected one of the receptacles.

It is envisaged that the hopper may include an open top for receiving grain into the hopper, and a grain removal opening provided in a hopper sidewall or base for removing grain from the hopper.

A suitable auger configuration may include an upper end for feeding grain into the grain inlet of a selected receptacle and a lower end for receiving grain from the hopper grain removal opening.

It may be convenient for the hopper to be connectable to the auger, thereby enabling the hopper to be moved with the auger, as may be necessary.

The arrangement may also include a header for feeding grain into the hopper through the open top of the hopper.

The invention is herein described and defined in the context of grain storage. However, it should be appreciated that the invention may be used in a range of possible bulk storage applications, including agricultural, industrial and commercial applications.

A particularly cost effective receptacle may be provided in the form of a freight container. If the invention utilizes a freight container for each receptacle, then it may be necessary to modify the container to suit its intended application.

The receptacle support may also be provided in the form of a freight container.

If a freight container is used for each receptacle, then the containers may require suitable reinforcement. Reinforcement may also be particularly necessary if a freight container is adapted for use as a receptacle support, given the potential combined weight of the receptacles and grain stored within the receptacles to be supported.

BRIEF DESCRIPTION OF THE DRAWINGS

It will be convenient to hereinafter describe a preferred embodiment of the invention with reference to the accompanying drawings. The particularity of the drawings is to be understood as not limiting the preceding broad description of the invention.

DETAILED DESCRIPTION OF THE DRAWINGS

Figure 1:
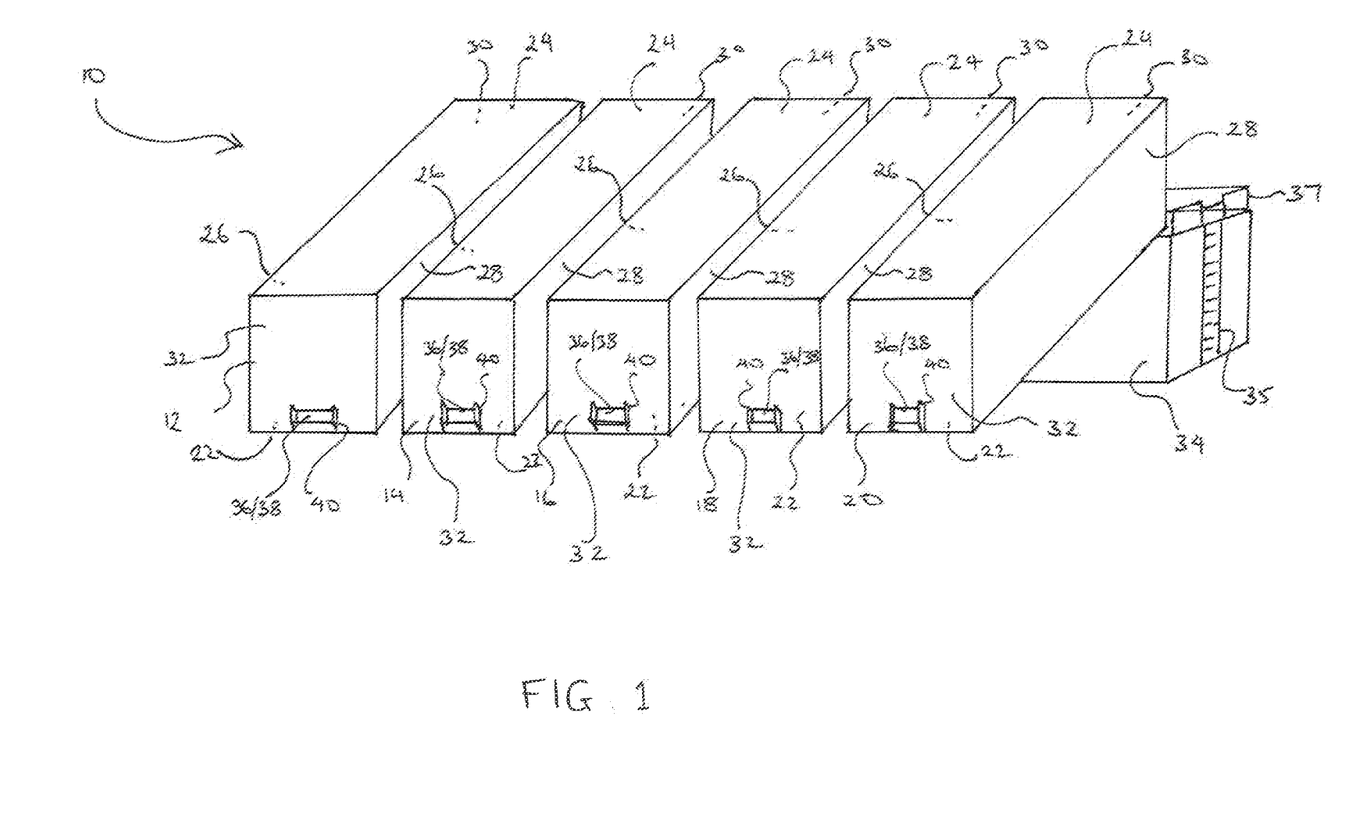
FIG. 1 is a diagrammatic front perspective view of a grain storage arrangement according to one embodiment of the present invention.
Figure 2:
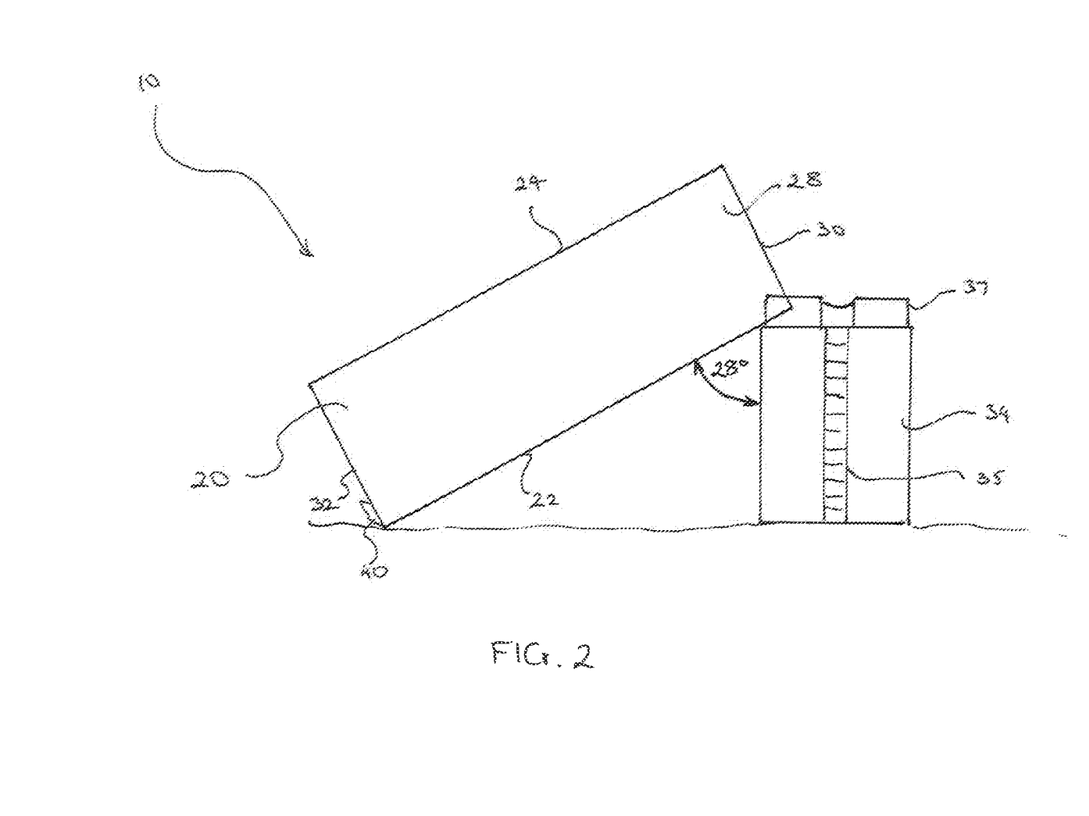
FIG. 2 is a diagrammatic side view of the grain storage arrangement illustrated in FIG. 1.
Figure 3:
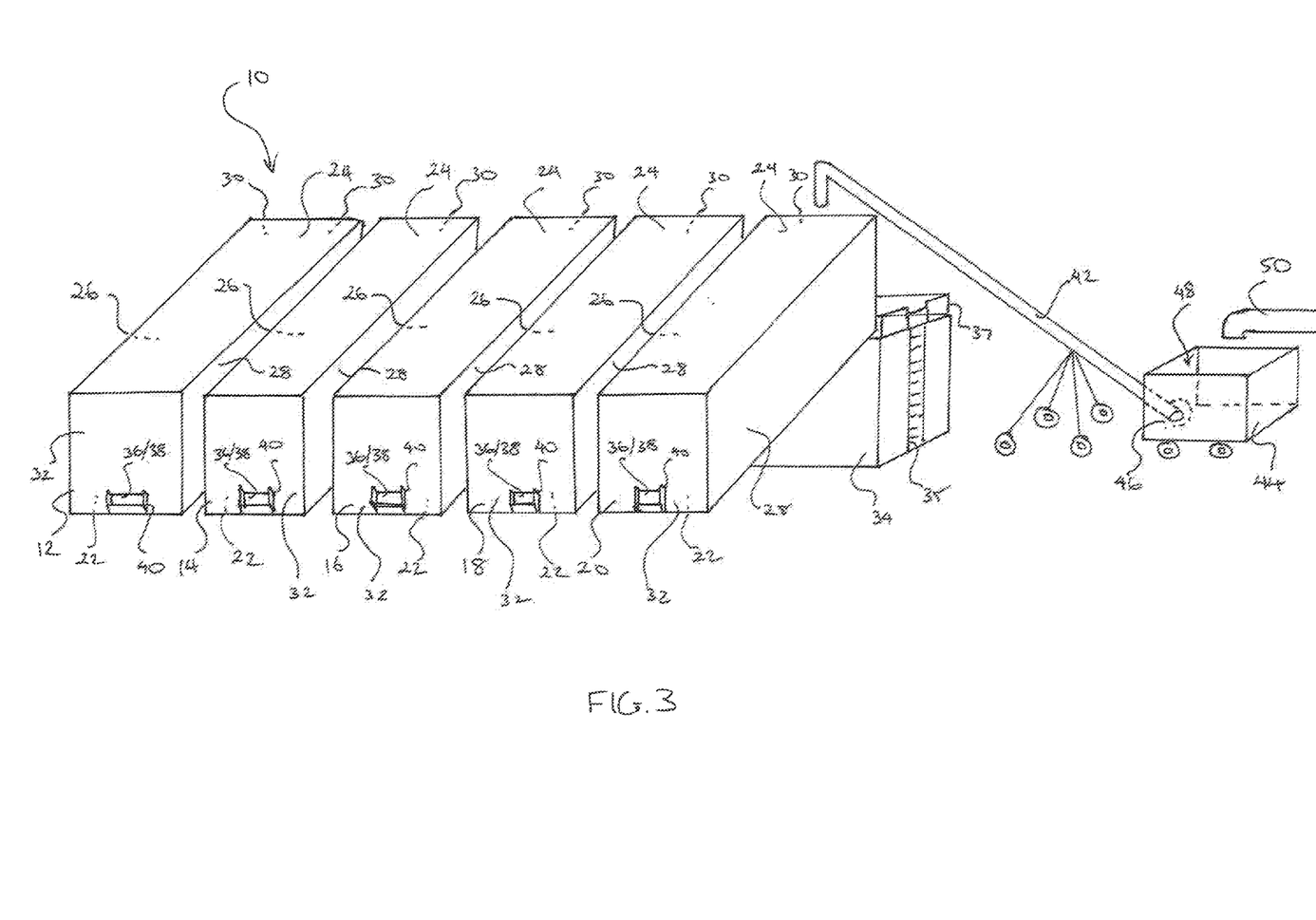
FIG. 3 is another diagrammatic front perspective view of the grain storage arrangement illustrated in FIG. 1, and including additional equipment.

Referring to the drawings, there is illustrated a grain storage arrangement 10. The arrangement 10 includes five box-shaped grain storage receptacles, each in the form of shipping (or freight) containers 12, 14, 16, 18, 20. Each container 12, 14, 16, 18, 20 includes a base 22, a top 24, two opposite sidewalls 26, 28, a first end wall 30, and a second end wall 32 opposite the first end wall 30. A grain receiving space is provided within each container 12, 14, 16, 18, 20. The containers 12, 14, 16, 18, 20 include a frame to which each of the base 22, top 24 and walls 26, 28, 30, 32 is mounted, although the frame hasn't been shown in the drawings for clarity purposes.

A receptacle support in the form of another freight container 34 is also provided. The container 34 rests with its base substantially flat on the ground. The container 34 supports the containers 12, 14, 16, 18, 20 such that the base 22 of each of the containers 12, 14, 16, 18, 20 slopes downwardly from the first end wall 30 to the second end wall 32. It is to be appreciated that the container 34 is not provided for storing grain or other goods, but may be used to store grain or other goods if desired. The container 34 may require reinforcement so as to support one end of each of the containers 12, 14, 16, 18, 20, and any grain stored within those containers.

Each of container 34 and containers 12, 14, 16, 18, 20 may be a 40 ft shipping container or a container of any other size (for example a 20 ft shipping container). Further, container 34 and containers 12, 14, 16, 18, 20 need not necessarily be shipping containers, and although not shown in the drawings, could be purpose built structures and of varying size and shape. For example, they may be triangular, or spherical, or rectangular structures in cross-section, capable of being filled directly from a chaser bin.

Further, the containers 34, 12, 14, 16, 18, 20 of the grain storage arrangement 10 may be primarily made of steel, or other metal and/or plastic alloys, or any material suitable for the desired use of the owner.

The container 34 is fitted with a ladder 35 and a safety rail 37. Although not shown in the drawings, a single or a number of ladders and safety rails may also be fitted to sections of the arrangement 10. For example, a ladder and safety rails may be fitted to the first or second end walls 30, 32 of at least one of the containers 12, 14, 16, 18, 20 and/or anywhere along the outside walls 24, 26, 28, 30, 32 of at least one of the containers 12, 14, 16, 18, 20, 34.

A suitable foundation may be necessary beneath the container 34 to support the weight of the other containers 12, 14, 16, 18, 20, 34 and any grain stored within the containers 12, 14, 16, 18, 20.

Each of the containers 12, 14, 16, 18, 20, 34 may include hooks (not shown) or some other suitable arrangement to assist in manoeuvring the containers into position during installation and removal.

Each of the containers 12, 14, 16, 18, 20 is secured to the container 34 to prevent relative movement there between. This may be by welding the containers 12, 14, 16, 18, 20 to container 34, the use of threaded fasteners between the containers, or some other suitable securing arrangement, for example a locking pin mechanism (not shown in the drawings).

A locking pin mechanism may utilise holes (not shown in the drawings) located anywhere along the frames of each container 12, 14, 16, 18, 20. When the containers 12, 14, 16, 18, 20 are lined up side by side, the holes are designed to align with each other, allowing the locking pins to engage the holes. In this respect a steel plate may be welded between two adjacent locking pins, which are then inserted into the holes of the adjacent containers. The pins are then rotated so as to orientate the ends of the pins in the holes in such a manner that they cannot be removed from the holes (i.e. the holes are not circular), subsequently securing the connection between two adjacent containers.

The use of freight containers 12, 14, 16, 18, 20, 34 provides a potentially cost effective grain storage solution, particularly if second hand (rather than new) freight containers are used.

Each of the containers 12, 14, 16, 18, 20, 34 may be 12.01 metres in length, 2.35 metres in width and 2.69 metres in height, although other suitably dimensioned containers may also be adopted.

Each container 12, 14, 16, 18, 20 is provided with a grain inlet (not shown) for adding grain to the container. It is to be appreciated the inlet could be positioned in numerous locations. In the arrangement 10, the inlet may be positioned along the top 24 section, the bottom section 22, or along the side walls 28, 32. In a preferred embodiment the inlet is positioned on or proximate to the first end wall 30. Most freight containers include a pair of swing doors in place of an end wall 30. In an alternative embodiment or in addition to other grain inlets, these doors can be utilised as a grain inlet to add grain to the container, and then closed to protect the grain within the container from the elements. If desired, the doors may be modified to further improve their suitability for receiving grain. Further, and although not shown, a winch mechanism may be used to assist with the opening of the inlet. The winch may be placed at any appropriate position, and for example may be placed on the along on the first end wall 30. Additionally, the opening and closing of the inlet may be mechanised.

It is to be understood that reference to a 'first end wall' in this specification may also refer to one or more swing doors integrated into or in place of a solid first end wall.

Each container 12, 14, 16, 18, 20 has been modified to include a grain outlet 36 provided in the second end wall 32. The grain outlets 36 are provided for removing grain from the containers 12, 14, 16, 18, 20. It is to be appreciated that the outlets 36 are provided at or proximate the lowermost point of each container 12, 14, 16, 18, 20, such that all grain can be removed from within the containers. Alternatively, and although not shown in the drawings, the outlets can be positioned at any suitable point so as to allow for the removal of grain from the containers 12, 14, 16, 18, 20.

Outlet covers 38 and chutes 40 are provided for each outlet 36. The outlet covers 38 are movable from an open position allowing grain to be removed from the containers 12, 14, 16, 18, 20, to a closed position.

Although not shown in the drawings outlet covers 38 and chutes 40 are not restricted to what is shown in the drawings, and can be of, or comprise any mechanism that allows the flow of content such as grain, out of the container. For example, the outlet covers 38 and chutes 40 may be of a 'truck chute' type. In this respect, the covers 38 may be hinged and may pivot about the hinge to an open or closed position. Alternatively, each cover 38 may be slidable into an open or closed position. Further, and although not shown in the drawings, the covers 38 and chutes 40 may be placed in any position along the containers 12, 14, 16, 18, 20, provided content can flow out of the containers 12, 14, 16, 18, 20. Additionally, although not shown, movement of the grain outlets 36, covers 38 and chutes 40 may be mechanised.

Although not shown in the drawings, a hopper device may be attached to each of the chutes 40, into which content such as grain can flow into.

Further, although not shown in the drawings, an auger system may be mounted along the outlet covers 38 and chutes 40. In this respect, any content exiting containers 12, 14, 16, 18, 20 will fall into the auger, and is subsequently moved along a path to prevent blockage of the outlet covers 38 and chutes 40. For example, the auger may move the content into a truck or another container. The system used to move the content along need not necessarily be an auger type of system, and may be a conveyor type system.

When fully loaded, each container 12, 14, 16, 18, 20 holds approximately 64.56 cubic metres of grain. This equates to approximately 52.4 tonnes of grain, when the grain within the container is wheat. In practical terms, however, the sloped orientation and the nature of filling the containers with grain means that each container will likely hold something less than 52.4 tonnes, perhaps in the order of 48 tonnes. If so, the combined weight of wheat stored in the five containers 12, 14, 16, 18, 20 shown in FIGS. 1 to 3 may be in the order of 240 tonnes, if each container is filled to its working capacity. Although not shown in the drawings, the grain storage system of the present invention can include at least one storage container and can include any number of containers or receptacles of the same size and configuration or of varying dimensions and configurations.

A funnel (not shown) may be provided on the inside of each container 12, 14, 16, 18, 20 about the outlets 36 to assist with the flow of grain when removing grain from the containers. Further, a mechanism (not shown) such as directional channels may be attached to the internal corners of the containers to assist with the flow of grain when removing grain. These channels may be stationary, resiliently operated, mechanically operated or electrically actuated.

The containers 12, 14, 16, 18, 20 are orientated such that their respective bases 22 slope downwardly from the first end wall 30 to the second end wall 32 at any suitable angle. In the illustrated embodiment, the base slope of each container 12, 14, 16, 18, 20 is approximately 28° degrees from horizontal, thereby enabling any grain stored within the containers to be readily removed though the outlets 36. The base of each container 12, 14, 16, 18, 20 need not be exactly 28° from horizontal, and can be in the range of 26° to 34° from horizontal. In embodiments not shown in the drawings, the base slope of each container 12, 14, 16, 18, 20 can be of any angle to facilitate the flow of grain, and may be greater than 34 degrees.

As shown in the drawings, the slope of each container 12, 14, 16, 18, 20 is achieved through the strategic positioning of container 34, upon which each container 12, 14, 16, 18, 20 rests. Although not shown in the drawings, the desired slope of each container 12, 14, 16, 18, 20 may also be achieved through the use strategically placed poles underneath each container 12, 14, 16, 18, 20, or through the use of a lifting device such as an hydraulic ram or crane, or a combination of both. Alternatively, the land under which each container 12, 14, 16, 18, 20 rests may be manipulated, such that each container 12, 14, 16, 18, 20 rests on an incline of compacted dirt, sand or any other suitable material.

Further, and although not shown in the drawings, containers 12, 14, 16, 18, 20 may be lifted individually, or the containers 12, 14, 16, 18, 20 may be lifted in any combination using a suitable lifting mechanism, from their resting position, to allow for filling and/or emptying of the containers 12, 14, 16, 18, 20.

As illustrated diagrammatically in FIG. 3, the arrangement 10 includes an auger 42 (or conveyer or other suitable grain feeding device). The auger 42 is provided for transferring (or feeding) grain from an associated grain hopper 44 and through the grain inlet of the containers 12, 14, 16, 18, 20. In FIG. 3, the auger 42 is shown transferring grain from the hopper 44 and into the container 20.

The auger 42 and hopper 44 are both mounted on wheels. This allows the auger and hopper to be moved to transfer grain stored from within the hopper 44 and through to the grain inlet of a selected one of the containers 12, 14, 16, 18, 20.

Hopper 44 includes an open top 48 for receiving grain into the hopper. The hopper 44 also includes a grain removal opening 46 provided in the lower end of the hopper sidewall 46. The auger 42 transfers grain from the hopper to the receptacles 12, 14, 16, 18, 20 via the opening 46.

Although not shown, the hopper 44 may be connectable to the auger 42, thereby enabling the hopper 44 and auger 42, to be moved together, as necessary.

The auger 42 can also be utilised for removing grain from the containers 12, 14, 16, 18, 20 through the outlets 36.

If desired, the containers 12, 14, 16, 18, 20 may be lined or coated to assist in the flow of grain through the containers.

FIG. 3 also illustrates a header 50 for feeding grain into the hopper 44 through the hopper's open top 48.

Although not shown in the drawings each of the containers 12, 14, 16, 18, 20 comprises a filling/entry point. Preferably the entry point comprises an aperture which is exposed or concealed by a cover. The cover may be in the form of a door located on an upper section of each, or any one of the containers 12, 14, 16, 18, 20. The door may be hinged, or slidable, and may rotate or slide in a vertical and/or horizontal direction.

Further, the filling/entry point may comprise an openable chute. The chute may also comprise a sloping channel/slide to smoothly transfer content such as grain to a lower level in the containers.

The grain storage arrangement is designed to store large volumes of grain. For example, as previously mentioned, it may store approximately 240 tonnes if each of the five containers 12, 14, 16, 18, 20 is filled to capacity. The storage capacity of the storage system 10 can be increased by introducing additional containers, or by providing receptacles/containers of different sizes and configurations to those depicted in the drawings. Although not shown in the drawings a footing may be provided underneath the base 22 of each container 12, 14, 16, 18, 20 to ensure the containers 12, 14, 16, 18, 20 remain unmoved under load, or when subjected to external loads such as wind force. The footing may be of any material capable of providing adequate support to each of the containers 12, 14, 16, 18, 20, for example concrete or timber. In addition to the footing along the base of the containers 12, 14, 16, 18, 20, an additional support (not shown in the drawings) may be provided anywhere between the base 32 and the upper most edge of the containers 12, 14, 16, 18, 20. This support may be in the form of a pole (resting on the ground or the support structure 34), a lifting device, a frame structure, or a compacted sloping surface. Where a compacted sloping surface is used, it is intended that at least two thirds of the length of each container 12, 14, 16, 18, 20 rests on the sloping surface. In an embodiment not shown in the drawings. a compacted sloping surface could extend to, or beyond the entire length of the each container 12, 14, 16, 18, 20.

Although not shown in the drawings, the grain storage system arrangement may include a guttering and fascia system along its roof and periphery to allow any rain water falling on the roof of the containers 12, 14, 16, 18, 20 to be transported to a water store or a storm water capture/treatment system. Any water captured may be used as livestock water, or for spraying of water on to plants.

In an alternative embodiment not shown in the drawings a pit may be created, below ground level, into which containers 12, 14, 16, 18, 20 are placed. The pit may comprise a gradient slope of 26° to 34° from the horizontal. It has been found that an angle of 26° is sufficient to overcome the frictional force of grain, so as to obtain flow of grain. The grain storage system functions relatively more effectively where the pit gradient slopes at an angle of 26° or higher. At least 66% of the length of the containers 12, 14, 16, 18, 20 is preferably to rest against the slope of the pit, which is also preferably compacted or reinforced to minimise movement over time. A footing may also be placed at the base of the pit to support the base 22 of the containers 12, 14, 16, 18, 20. Placing containers 12, 14, 16, 18, 20 in a purpose-dug pit advantageously reduces the height of the top 24 of containers 12, 14, 16, 18, 20, above ground level. This allows the top 24 of containers 12, 14, 16, 18, 20 to be reached directly from auger or like machinery (either directly or through a ramp with a plateau), without the need for pumping, lifting, or additional unloading and reloading into more powerful and further reaching machinery. Alternatively, an auger extension may be placed on a filling chasing bin.

Where an auger extension can be attached to a filling chasing bin, the depth of the pit may be significantly reduced.

In this alternative embodiment, the footing may be made of concrete, or any other suitable material. A hopper may be placed along the base 22 at or proximate the outlet cover 28 and chute 40. The hopper may be integral with the footing or integral with the ground. The containers 12, 14, 16, 18, 20 may be filled with content, such as grain, through a filling entry point/mechanism which may be placed at any suitable position on the containers 12, 14, 16, 18, 20.

Where a pit has been created, water pooling is a common problem. To address this, a sump may be placed below or adjacent the footing. A pipe channel or trenches may be fed into the sump to transfer the water to a water store or a storm water system. Additionally, the roofing of the grain storage arrangement may comprise a fascia and guttering system which directs water into the pipe channel/trench network.

In this alternative embodiment the pit depth, the angle at which the containers 12, 14, 16, 18, 20 sit, and auger filling height can all be calculated to cater for different purposes, and to accommodate different land features.

In further alternative embodiments not shown in the drawings, the grain storage arrangement may comprise at least one upright container 12, 14, 16, 18, 20, resting flat on its base surface 22; or at least one container 12, 14, 16, 18, 20, or receptacle resting flat in a horizontal orientation. A hopper may be placed on one side, or underneath the at least one container 12, 14, 16, 18, 20 to allow content such as grain to be emptied from the at least one container 12, 14, 16, 18, 20. A ladder and safety rails may be provided along sections of the at least one container 12, 14, 16, 18, 20. In this alternative embodiment the grain storage arrangement 10 may comprise any number of containers or receptacles so as to provide the required amount of storage.

In further alternative embodiments, the walls of the containers 12, 14, 16, 18, 20 may be reinforced. Further, the containers 12, 14, 16, 18, 20 may be lined with a low friction surface, or shaped internally to allow for more effective/efficient flow of grain or other contents.

Although not shown in the drawings, the containers 12, 14, 16, 18, 20 may comprise one or more viewing windows of any shape or size on any part of the containers 12, 14, 16, 18, 20. This will allow users to visually inspect the internal receiving space of the containers 12, 14, 16, 18, 20. To assist with the maintenance of the receptacles/containers, the containers 12, 14, 16, 18, 20 may comprise a man-hole (not shown) which may be positioned anywhere along the containers 12, 14, 16, 18, 20, providing access to the internal receiving space through the man-hole. A ladder (not shown) may be provided adjacent each man-hole to allow a person to climb into and out of the receiving space of the containers 14, 16, 18, 20. Alternatively, and although not shown in the drawings, the containers 14, 16, 18, 20 may comprise an openable door at either end 30, 32, which when opened, a person can walk into and out of the container.

To ensure the quality of the stored grain in the grain storage arrangement 10, the containers may comprise a climate control system (not shown in the drawings). The installed climate control system will allow the containers 12, 14, 16, 18, 20 to store content within a pre-specified temperature and humidity. These pre-specified climate parameters may be adjustable to allow users to specify, for example, storage temperature and humidity ranges as prescribed by industry standards. This system may include a drying mechanism attached to one or all receptacle/containers 12, 14, 16, 18, 20.

The grain storage arrangement 10 may include a series of sensors (not shown) or devices used to computationally determine the capacity and environmental parameters of the stored content. With the use of SCADA (supervisory control and data acquisition) technology, the grain storage arrangement 10 may comprise a software program/website platform. The software platform/website will enable growers/farmers/users/owners/purchasers of the grain storage arrangement 10 to adjust the storage conditions remotely or on site. Further, the information derived through the SCADA system will enable owners to publicly make available information regarding the content (such as grain stored in the storage arrangement 10) stored to stakeholders such as purchasers or auditors. In one embodiment, grain purchasers may be able to log on to a website or use a software platform to view in real-time the amount of grain available and to purchase the quantities of grain stored in the storage arrangement 10.

The present invention desirably provides a temporary grain storage solution which is relatively weather proof when compared to several existing grain storage arrangements. It also desirably provides an arrangement enabling grain to be relatively easily added to and removed from the arrangement. Advantageously, the present invention also provides a lower-cost arrangement to construct when compared to silos currently in use.

Finally, it is to be understood that the various alterations, modifications and/or additions may be introduced into the construction and arrangement of the parts previously described without departing from the spirit or ambit of this invention.

What is claimed is:

1. An on-farm grain storage arrangement, the arrangement including:
    a generally box-shaped grain storage receptacle enclosing a grain receiving space;
    the storage receptacle including a base, a top, two opposite sidewalls, a first end wall, and a second end wall opposite the first end wall;
    a receptacle support, wherein the receptacle support supports the receptacle such that the base slopes downwardly from the first end wall to the second end wall;
    a grain inlet provided on or proximate to the first end wall for adding grain to the receptacle;
    a grain outlet provided at or proximate to a lower most point of the second end wall for removing grain from the receptacle,
    wherein the receptacle has a storage limit exceeding 45 tons, and
    wherein the receptacle support is selected from the group consisting of:
        a compacted sloping surface,
        a pit comprising a compacted sloping surface, and
        a second receptacle having a footing, wherein a base section at or proximate the first end wall is supported in an elevated position relative to a base section of the second end wall which rests on a different surface, wherein the base of the supported receptacle slopes from the first end wall to the second end wall.

2. An on-farm grain storage arrangement according to claim 1, wherein the inlet includes an inlet cover.

3. An on-farm grain storage arrangement according to claim 2, wherein the inlet cover is movable from an inlet open position to an inlet closed position.

4. An on-farm grain storage arrangement according to claim 1, wherein the outlet includes an outlet cover, the outlet cover movable from an outlet open position to an outlet closed position.

5. An on-farm grain storage arrangement according to claim 4, the outlet including a surrounding chute extending from the second end wall.

6. An on-farm grain storage arrangement according to claim 1, including at least two receptacles, wherein the receptacle support supports the receptacles, such that the base of each receptacle slopes downwardly from the first end wall of the receptacle to the second end wall of the receptacle.

7. An on-farm grain storage arrangement according to claim 6, including five receptacles.

8. An on-farm grain storage arrangement according to claim 1, wherein the base of each receptacle slopes downwardly from the first end wall to the second end wall at an angle of between approximately 20° and approximately 40° from horizontal.

9. An on-farm grain storage arrangement according to claim 8, wherein the base of each receptacle slopes downwardly from the first end wall to the second end wall at an angle of approximately 28° degrees from horizontal.

10. An on-farm grain storage arrangement according to claim 1, including an auger configured to feed grain through the grain inlet of each receptacle.

11. An on-farm grain storage arrangement according to claim 10, wherein the auger is mounted on wheels.

12. An on-farm grain storage arrangement according to claim 10, including a hopper, the hopper including an open top for receiving grain into the hopper, and a grain removal opening provided in a hopper sidewall or base for removing grain from the hopper.

13. An on-farm grain storage arrangement according to claim 12, the auger having an upper end for feeding grain into the grain inlet of each receptacle and a lower end for receiving grain from the hopper grain removal opening.

14. An on-farm grain storage arrangement according to claim 12, wherein the hopper is mounted on wheels.

15. An on-farm grain storage arrangement according to claim 12, wherein the hopper is connectable to the auger, enabling the hopper to be moved with the auger.

16. An on-farm grain storage arrangement according to claim 12, including a header for feeding grain into the hopper through the open top of the hopper.

17. An on-farm grain storage arrangement according to claim 1, wherein each grain storage receptacle and the receptacle support are re-purposed shipping or freight containers.

18. An on-farm grain storage arrangement according to claim 1, further comprising a series of sensors and telemetry to provide real-time information on content stored in each receptacle.

19. An on-farm grain storage arrangement according to claim 1, wherein the grain inlet is provided on the first end wall for adding grain to the receptacle;
    and the grain outlet is provided on the second end wall for removing grain from the receptacle.

20. An on-farm grain storage arrangement according to claim 1, wherein the receptacle support supports the receptacle such that the base slopes downwardly from the first end wall to the second end wall at an incline between 26° to 34° from the horizontal.

\* \* \* \* \*